(12) United States Patent
Zhu et al.

(10) Patent No.: US 8,098,889 B2
(45) Date of Patent: Jan. 17, 2012

(54) SYSTEM AND METHOD FOR VEHICLE DETECTION AND TRACKING

(75) Inventors: Ying Zhu, Monmouth Junction, NJ (US); Gregory Baratoff, Wangen-Feld (DE); Thorsten Köhler, Lindau (DE)

(73) Assignees: Siemens Corporation, Iselin, NJ (US); Continental Automotive GmbH, Hannover (DE)

( * ) Notice: Subject to any disclaimer, the term of this patent is extended or adjusted under 35 U.S.C. 154(b) by 952 days.

(21) Appl. No.: 12/014,397

(22) Filed: Jan. 15, 2008

(65) Prior Publication Data
US 2008/0273752 A1    Nov. 6, 2008

Related U.S. Application Data

(60) Provisional application No. 60/885,479, filed on Jan. 18, 2007.

(51) Int. Cl.
*G06K 9/00* (2006.01)
(52) U.S. Cl. ........ 382/103; 340/907; 340/908; 340/909; 340/910; 340/911; 348/113; 348/114; 348/115; 348/116; 348/117

(58) Field of Classification Search .................. 382/100, 382/103–107; 340/907–911, 933–938; 600/425–429; 378/4, 69; 348/113–120, 348/169–173
See application file for complete search history.

(56) References Cited

U.S. PATENT DOCUMENTS

| 5,761,326 | A | 6/1998 | Brady et al. |
| 7,046,822 | B1 | 5/2006 | Cartsen et al. |
| 2004/0234136 | A1* | 11/2004 | Zhu et al. ....................... 382/224 |
| 2004/0246167 | A1* | 12/2004 | Kumon et al. .................. 342/70 |
| 2008/0112593 | A1* | 5/2008 | Ratner et al. .................. 382/103 |

* cited by examiner

*Primary Examiner* — Atiba O Fitzpatrick
(74) *Attorney, Agent, or Firm* — Donald B. Paschburg; F. Chau & Associates, LLC

(57) ABSTRACT

A method for vehicle detection and tracking includes acquiring video data including a plurality of frames, comparing a first frame of the acquired video data against a set of one or more vehicle detectors to form vehicle hypotheses, pruning and verifying the vehicle hypotheses using a set of course-to-fine constraints to detect a vehicle, and tracking the detected vehicle within one or more subsequent frames of the acquired video data by fusing shape template matching with one or more vehicle detectors.

34 Claims, 12 Drawing Sheets

71

72

80

SYSTEM AND METHOD FOR VEHICLE DETECTION AND TRACKING

CROSS-REFERENCE TO RELATED APPLICATION

The present application is based on provisional application Ser. No. 60/885,479 filed Jan. 18, 2007, the entire contents of which are herein incorporated by reference.

BACKGROUND OF THE INVENTION

1. Technical Field

The present disclosure relates to vehicle detection and, more specifically, to a system and method for vehicle detection and tracking from a moving monocular camera.

2. Discussion of the Related Art

Vehicle safety and convenience features are an important and growing field of technology. Through the use of a video camera mounted on a moving vehicle, video signals may be analyzed using computer vision techniques to provide advanced driver assistance and potentially life saving support to the vehicle operator. For example, by analyzing video signals and/or other sensor data, the vehicle operator may be alerted to potential obstacles and hazards and in some cases, vehicle control may be automatically assisted.

When in motion, potential obstacles and hazards include objects that rise above the road plane such as pedestrians and other vehicles. Because other vehicles often present a particular hazard, the detection and tracking of other vehicles is an important part of computer vision-based safety and convenience features.

Thus, obstacle detection, for example vehicle detection, may receive a video signal from a video camera located within or upon the moving vehicle and recognize and track preceding vehicles from the driving scene. This information may then be utilized by one or more vehicle safety and convenience features, for example, adaptive cruise control, forward collision avoidance and lane change support.

A number of approaches have been developed to address vehicle tracking and detection. One category of obstacle detection methods uses motion analysis. In such methods, the motion of the video camera within the host vehicle is accounted for so that the motion vectors of other objects may be determined with reference to the stationary road. Objects determined to be in motion relative to the stationary road may be identified as potential obstacles and accordingly monitored.

Obstacle detection approaches using only motion analysis may be particularly sensitive to image noise and illumination changes. In addition, motion analysis alone may not be able to classify detected objects.

In another approach, a 3D polyhedral model is used to detect and track vehicles in a surveillance setup. A target vehicle is described in a 2D view sketch composed of edge segments specified by their length parameters. This approach requires the monitored zone to be stationary, thus the camera and the ego vehicle are not moving. When the camera together with the ego vehicle is moving, the technique of background subtraction and change detection is no longer able to separate a target vehicle from changing traffic scene.

In another known approach, distant vehicles are detected and identified by the detection of the vehicle's horizontal and vertical edges, aspect ratio check and correlation of the distant vehicle to predefined templates. If camera parameters are available, the distance of the detected vehicles from the host vehicle (i.e. ego-vehicle) can be estimated through the use of a perspective projection model. In some instances, the detection starts from feature selection and tracking. Tracked features are grouped into clusters corresponding roughly to different objects in the scene. Vehicles are identified and validated through edge finding. A simple vehicle classification scheme is used based on the aspect ratio to distinguish from among various categories of vehicles. In other approaches, a probabilistic model is used to model the strength of the edges around the vehicle boundary. In these approaches, vehicle detection is implemented by locating bounding boxes from edges and verifying the vehicle presence with the edge model. The detected vehicles may then be tracked with the use of and extended Kalman filter.

A second category of vehicle detection algorithms treats the detection as a two-class pattern classification problem involving a vehicle class and a non-vehicle class. Instead of using the empirical descriptions for the vehicle class, these algorithms use a classification function to tell if an image patch contains a vehicle or not. Through an offline training process, the best classification function with minimum classification error is learned from a number of vehicle and non-vehicle examples. The training process takes into account the variation of vehicle appearance within the training examples. Compared to the empirical vehicle model with edges, shapes and templates, the training and classification approach produces more reliable detection results.

In one approach, a vehicle detection algorithm is implemented in two steps: multi-scale hypothesis generation and appearance-based hypothesis verification. Appearance-based hypothesis verification verifies the hypothesis using wavelet feature extraction approach and Support Vector Machines (SVMs) as classifiers. In another approach, a Support Vector Tracking (SVT) method is introduced, which integrates the SVM classifier into an optical-flow based tracker. Instead of minimizing an intensity difference function between consecutive frames, SVT maximizes the SVM score such that the detection results have the highest confidence scores in the corresponding video frames.

In these approaches, the classifier response is computed over a neighborhood region around the vehicle position detected from the previous frame. The location with the highest response is considered the vehicle position in the current frame. The focus of such detection methods is to build an accurate and efficient vehicle detector (classifier). Tracking is considered a process of data association that links the detection results from individual frames to a temporal trajectory.

Accordingly, there is a present need for effective and efficient systems and methods for detecting and tracking preceding vehicles

SUMMARY

A method for vehicle detection and tracking includes acquiring video data including a plurality of frames, comparing a first frame of the acquired video data against a set of one or more vehicle detectors to form vehicle hypotheses, pruning and verifying the vehicle hypotheses using a set of course-to-fine constraints to detect a vehicle, and tracking the detected vehicle within one or more subsequent frames of the acquired video data by fusing shape template matching with one or more vehicle detectors.

The video data may be acquired using a camera mounted on a moving host vehicle. The set of vehicle detectors may include at least one class-specific detector. The set of vehicle detectors may include at least one car specific detector. The set of vehicle detectors may include at least one truck specific detector. The set of vehicle detectors may include an "L" shape corner detector and its mirrored shape corner detector.

The set of course-to-fine constraints may include vehicle part detectors learned from examples of vehicle lower left part and vehicle lower right part. The vehicle part detectors may be followed by an orientation histogram constraint. The orientation histogram constraint may be followed by a cascade car/truck detector.

The vehicle hypotheses may be pruned and verified with a second set of one or more vehicle detectors, different from the set of one or more vehicle detectors used to form the vehicle hypotheses.

The responses of vehicle detectors may be accumulated over time. The detected vehicle may be tracked within subsequent frames by kernel-based probabilistic shape tracker. The kernel-based probabilistic shape tracker may estimate vehicle motion by matching feature points in an image region with one or more shape templates that have been extracted from a corresponding target of a previous frame. The shape templates may be composed of a set of zero-crossing points. The zero-crossing points may be described by their locations and gradient vectors.

Matching feature points in an image region with a shape template may be performed by optimizing a kernel-based nonparametric density estimation on zero-crossing points. Optimizing a kernel-based nonparametric density estimate on zero-crossing points may generate multiple modes of vehicle motion parameters. A single best mode of vehicle motion parameters may be determined as the mode that has the highest function value of the kernel-based nonparametric density estimate and whose response from the vehicle detectors is above a pre-selected value. The shape templates may be updated to reflect frame-to-frame variance in target appearance.

The method may further include assembling results of the verifying step and the tracking step to determine whether tracking is maintained or terminated. Multiple vehicles may be tracked simultaneously. The first video frame may be represented as an image pyramid of multiple resolutions. In the forming of the vehicle detection hypotheses, detection of a vehicle appearing to be relatively small may be performed in a relatively high resolution and detection of a vehicle appearing to be relatively large may be performed in a relatively low resolution. Tracking may be performed at multiple resolutions.

In verifying the vehicle detection hypotheses using a set of course-to-fine constraints, one or more component detectors may be used. The verified vehicle hypotheses may be additionally verified using a whole-appearance vehicle detector. Template-based tracking may be used to track the detected vehicle within the one or more frames. Template-based tracking may use kernel-based probabilistic shape tracking.

A system for vehicle detection and tracking includes a camera mounted on a moving host vehicle for acquiring video data including a plurality of frames and a central tracker for comparing a first frame of the acquired video data against a set of one or more vehicle detectors to form a vehicle detection hypotheses, verifying the vehicle detection hypotheses to detect a vehicle, and tracking the detected vehicle within one or more subsequent frames of the acquired video data.

The set of vehicle detectors may include at least one car or truck specific detector. The first video frame may be represented as an image pyramid of multiple resolutions and tracking is performed at multiple resolutions. Template-based tracking may be used to track the detected vehicle within the one or more frames and the template-based tracking may use kernel-based probabilistic shape tracking.

A computer system includes a processor and a program storage device readable by the computer system, embodying a program of instructions executable by the processor to perform method steps for vehicle detection and tracking. The method includes acquiring video data including a plurality of frames, comparing a first frame of the acquired video data against a set of one or more vehicle detectors to form a vehicle detection hypotheses, and tracking the detected vehicle within one or more subsequent frames of the acquired video data.

The vehicle detection hypotheses may be verified using a set of course-to-fine constraints to detect a vehicle. The set of vehicle detectors may include at least one car or truck specific detector. The first video frame may be represented as an image pyramid of multiple resolutions and tracking may be performed at multiple resolutions. Template-based tracking may be used to track the detected vehicle within the one or more frames and the template-based tracking may use kernel-based probabilistic shape tracking.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
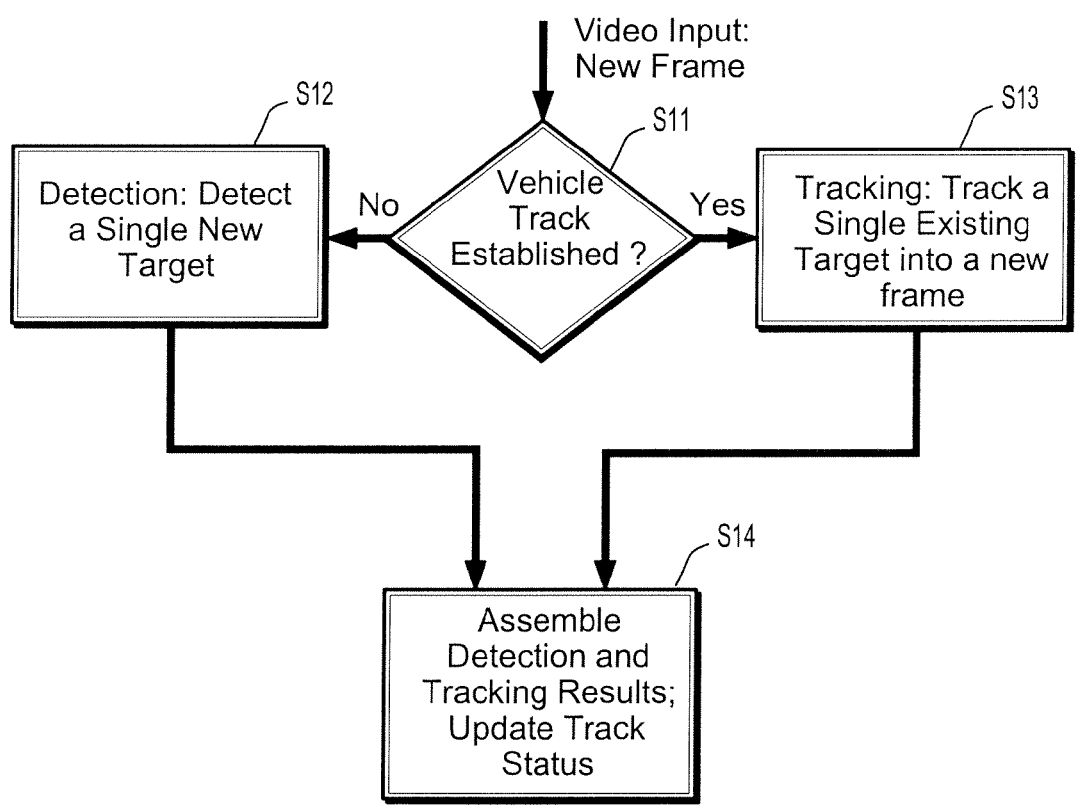
FIG. 1 is a flow chart showing a detection and tracking framework according to an exemplary embodiment of the present invention.

In describing the exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention provide systems and methods for video vehicle detection and tracking. Detection and tracking may be performed by matching acquired video data against a set of known vehicle detectors. A vehicle detector is a set of features indicative of a particular class of vehicles and thus the particular class of vehicle may be identified within the video image by matching an aspect of the video image against the set of known vehicle identifiers. The vehicle identifiers may be trained off-line using training data from video images.

Gradient-based features in either gradient or log-gradient images (i.e. gradient of logarithm images) may be used to characterize vehicle contours and internal structures, and can be implemented efficiently through the use of integral images. Different kinds of features are used in part/car/truck detectors and accordingly, vehicle detectors may be specific for a particular class of vehicles to increase detection precision.

Part/car/truck detectors may be trained off-line using training data. Strong classifiers may be composed of a set of weak classifiers that are introduced to a boosting framework for training part/car/truck detectors. In addition to the weak classifiers defined by individual features, the composition of weak decisions on pairs of features may also be used to define additional weak classifiers. A boosted classifier with composite weak classifiers may require fewer features to reach the same level of classification accuracy. The training algorithm involving composite weak classifiers may be known in the art.

In defining weak classifiers, multiple decision stumps may be used. This approach may replace single-thresholding schemes for defining weak classifiers. The new scheme may reduce classification error, and consequently requires less weak classifiers to achieve the same level of accuracy.

After vehicle detectors are trained off-line, the trained vehicle detectors may be integrated into a vehicle detection and tracking system that is used within a host vehicle to identify and track other preceding vehicles, a process known as on-line vehicle detection.

Exemplary embodiments of the present invention may utilize a simple corner detection approach which may be significant faster than using part detectors to generate hypotheses of vehicle corners, for example, the two lower corners on the ground. The part detectors may be binary classifiers that separate the class of vehicle parts from the class of non-vehicle-parts. They may be learned from vehicle and non-vehicle examples.

Exemplary embodiments of the present invention may use a set of coarse-to-fine constraints to perform hypothesis verification (HV). They may include geometry constraint, one-class constraint, cascade of classifiers for eliminating non-vehicle hypotheses, and the boosted vehicle detectors. Hypotheses of left and right vehicle corners may be grouped into pairs which satisfy a constraint on vehicle size. The more computationally expensive part detectors may be applied after simple corner detection to rule out hypotheses from non-vehicles. A relatively expensive procedure of orientation histogram constraint may be applied after part detectors to further rule out non-vehicle hypotheses. Finally, an optional step of cascaded car/truck detector can be applied after orientation histogram check to further remove non-vehicle hypotheses.

Separate detectors may be used for cars and trucks for hypothesis validation (HV). Additional classification approaches may be used where a rigorous vehicle categorization is required.

Exemplary embodiments of the present invention may track vehicles by matching feature points of objects within the video image with shape templates that may be extracted from a corresponding target extracted in a previous video frame. Shape templates may be updated to reflect the frame-to-frame variance in target instance appearance. The template updating process may be guided by appearance-based detection. The appearance-based vehicle detector may then be used to verify the tracking results.

Exemplary embodiments of the present invention may utilize an integrated detection and tracking approach that performs fusion of frame-wise vehicle detection and inter-frame vehicle tracking. In integrated detection and tracking, temporal association of image sequences is exploited to increase consistency and accuracy of frame-wise detection. Since a target vehicle moves through multiple frames, its appearance may be consistent over time which is reflected in the matching of image regions over consecutive frames. Temporal association imposes necessary constraints for target detection and localization. Exploiting temporal association, single frame detection is extended into detecting vehicle trajectories in consecutive frames through accumulation framewise evidence.

Frame-wise vehicle detection may also verify that temporal tracking does not derail from the vehicle target (for example, the drifting problem associated with tracking methods in general), and the vehicle target does not disappear from the field of view. Thus, Tracking may also be supplemented with a mechanism for terminating lost or invalid tracks.

The basic detection and tracking functions as herein described may be used or combined in many flexible ways to accommodate application requirements. Two example applications are as follows: (1) In a camera system for traffic jam assist, a single vehicle preceding the ego vehicle is detected and tracked using an on-board forward-looking camera system. Exemplary embodiments of present invention may be used to maintain a track of an immediate preceding vehicle over time and to determine its distance from the ego vehicle and its lane assignment. (2) In a Licam system for adaptive cruise control and pre-crash warning applications, exemplary embodiments of the present invention may be used as video component, for example, a video vehicle detection module (VVD), to provide video measurements. A central detection and tracking engine may be introduced to fuse video measurements with Lidar measurements to detect and track other vehicles in the field of view and determine the location of preceding vehicles relative to the host vehicle. VVD may perform single or multiple vehicle detection in a list of Region-Of-Interests (ROIs) specified by the central detection and tracking engine. Detection results may include vehicle 2D locations and confidence scores. Detection results may be sent to a central detection and tracking apparatus.

Particular algorithms for detection of passing vehicles are known in the art, and will not be addressed here. Further algorithmic extension for coarse tracking and flagging passing vehicles over neighboring lanes is addressed are known in the art. Such algorithms may be applied to exemplary embodiments of the present invention discussed herein.

Preliminary algorithms for night-time vehicle detection and tracking are known in the art and are not describe in detail herein. However, such algorithms may be applied to exemplary embodiments of the present invention discussed herein.

Similarly, algorithms for day & night fusion are known in the art and are presently under development. Examples of such algorithms are discussed in D. Acunzo, Y. Zhu, B. Xie, G. Baratoff, "Context-Adaptive Approaches for Vehicle Detection Under Varying Lighting Conditions," IEEE ITSC 2007, which is herein incorporated by reference.

Algorithms of off-line learning, night-time vehicle detection and tracking, detection of vehicle passing are known in the art as well.

FIG. 1 is a flow chart showing a detection and tracking framework according to an exemplary embodiment of the present invention. When assisting a driver with the following of a preceding vehicle, detection and tracking of a single vehicle may be performed. There may be three main functions involved in vehicle detection and tracking: a detection step (S12), a tracking step (S13), and an assemble step (S14). In the detection step (S12), a function is carried out to detect a new target when no vehicle is being detected (No, Step S11). If a vehicle has been detected, (Yes, Step S11) the tracking step (S13) may be performed to extend the vehicle tracking into the new frame. The results of the detection step (S12) and the tracking step (S13) may be processed in the assemble step (S14), where reasoning is done to initiate, maintain or terminate a single vehicle track and/or update track status.

Figure 2:
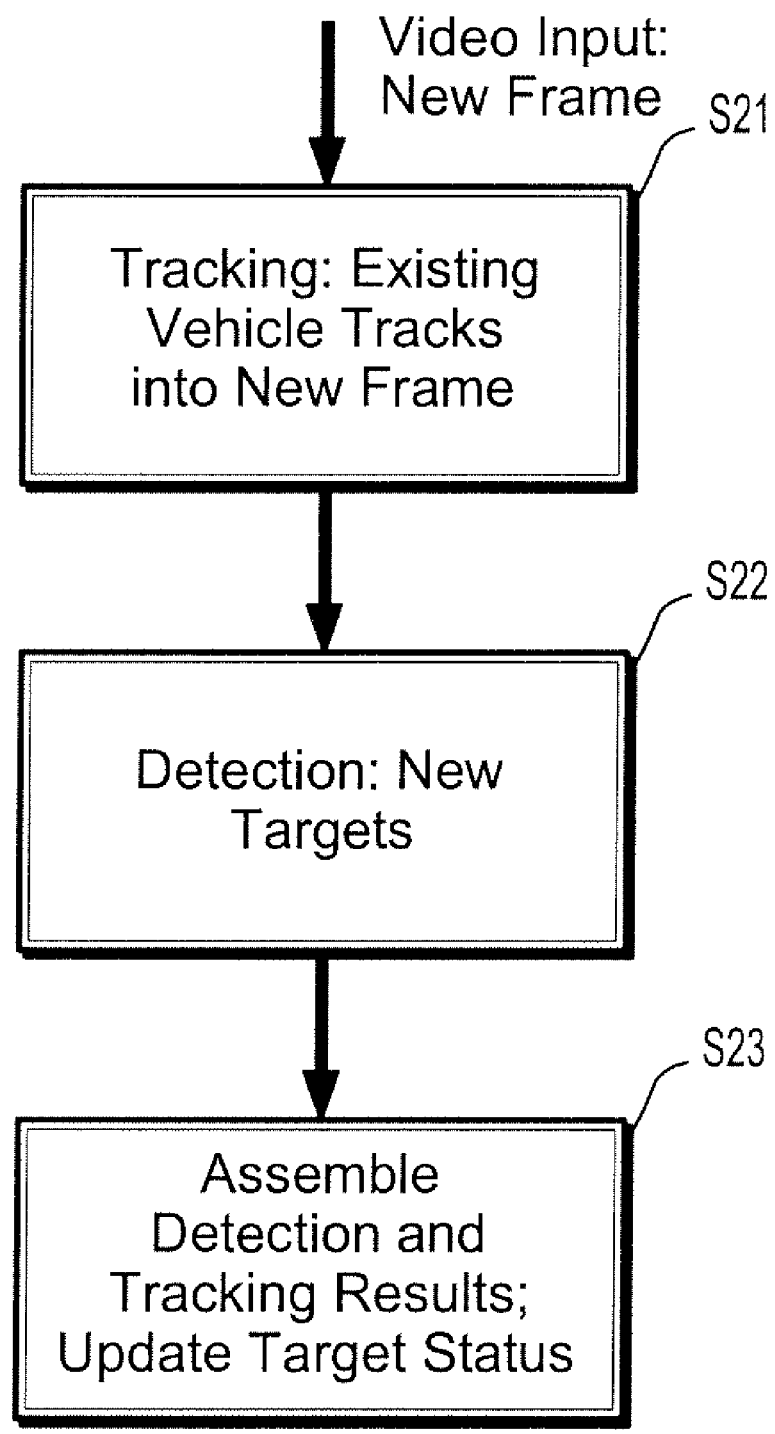
FIG. 2 is a flow chart showing a detection and tracking framework according to another exemplary embodiment of the present invention.

To detect and track multiple vehicles, this framework may be modified, for example, as illustrated in FIG. 2. FIG. 2 is a flow chart showing a detection and tracking framework according to another exemplary embodiment of the present invention. For each incoming frame, a tracking step (S21) may be performed to extend existing vehicle track into the new frame, then a detection step (S22) may be performed to recognize new vehicles. Finally, an assemble step (S23) may be performed to merge detection and tracking results by examining the history and the spatial relation of detected and tracked targets.

In the exemplary embodiment discussed below, a single vehicle in front of the host vehicle is being detected and tracked. This example is offered for ease of illustration however, it is to be understood that any number of vehicles may be tracked from any side(s) of the host vehicle.

Figure 3:
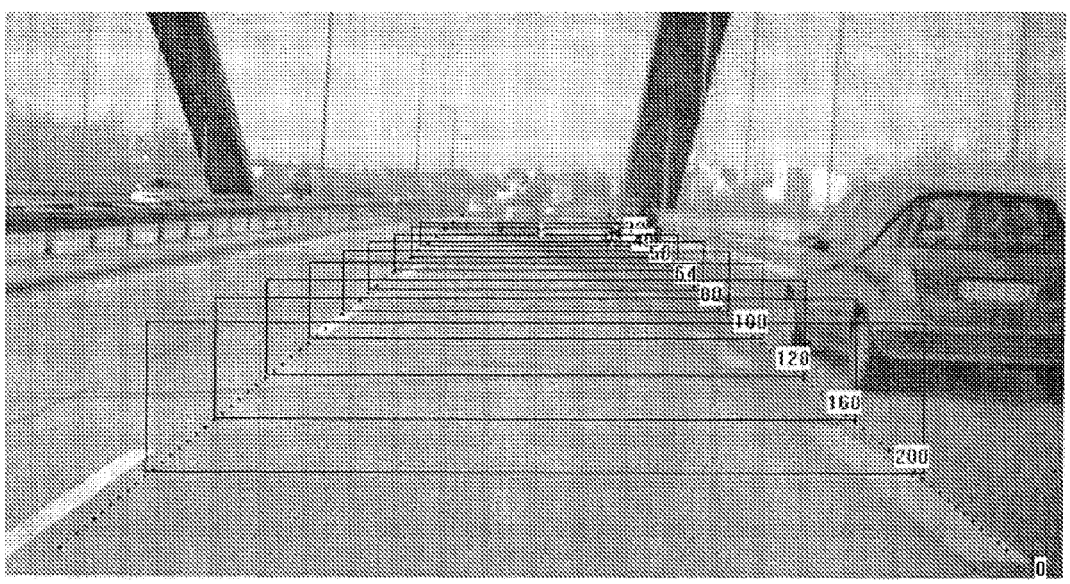
FIG. 3 illustrates detection regions of interest corresponding to various small to large scales according to an exemplary embodiment of the present invention.

FIG. 3 illustrates the detection ROIs corresponding to small to large scales. FIG. 3 is described in detail below.

Figure 4:
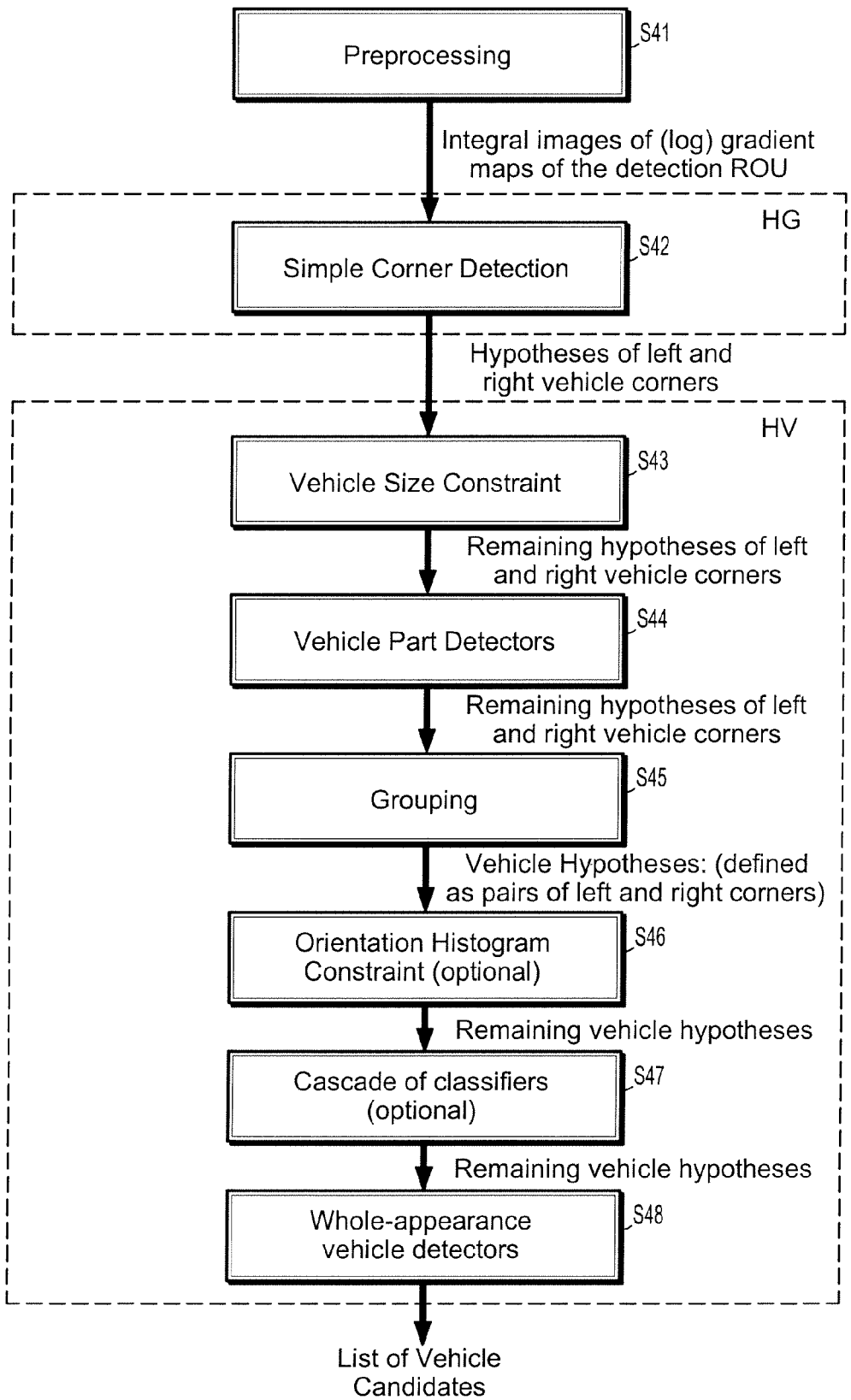
FIG. 4 is a flow chart illustrating a process for hypothesis generation (HG), hypothesis pruning and hypothesis verification (HV), according to an exemplary embodiment of the present invention.

The task of vehicle detection is to detect the appearance of a new vehicle, for example, a vehicle that has not been identified from a previous frame. FIG. 4 is a flow chart illustrating a process for hypothesis generation (HG), hypothesis pruning and hypothesis verification (HV), according to an exemplary embodiment of the present invention. Here, a simple and flexible mechanism is used to rapidly generate vehicle hypotheses, prune hypotheses and verify those remaining hypotheses with more accurate yet expensive classifiers. The details of this approach are described in greater detail below with reference to FIG. 4

As the observed size of vehicles may vary widely depending on the distance between the vehicle and the ego vehicle, exemplary embodiments of the present invention may be able to detect vehicles of arbitrary sizes within an image frame. To accomplish detection of vehicles of arbitrary sized, an image frame may be represented by an image pyramid of several resolution levels. Detection of small vehicle appearance (for example, distant vehicles) may be performed in the original resolution, while detection of large vehicle appearance (for example, proximate vehicles) may be accomplished in a reduced resolution. Reduced resolution images may be generated by the use of a Gaussian filter and/or by down-sampling, for example, by two. There may be multiple levels of reduced resolution with each subsequent image having a further reduction. Thus, there may be a pyramid of images having various resolutions for each image frame. The pyramid representation may also be useful for tracking a large vehicle in reduced resolution.

Camera parameters, for example, pitch, roll, yaw angles, camera location regarding the road plane as well as internal camera parameters, assuming there is a point of touch between a vehicle and the road surface, may be used to obtain a rough mapping between the 2D width of a vehicle appearance and the 2D image position (vertical) of the vehicle bottom which touches the ground. Vehicle appearance with certain size may appear in only a limited area of the image. Thus, for a given vehicle size, a valid detection area may be defined, for example, the Region-of-Interest (ROI) for that size.

Since the computation may be too heavy if detection is performed for all vehicle sizes in every frame, a scheme of alternate scanning along the scale dimension may be adopted in hypothesis generation (HG). As used herein, the term "scale" may denote the vehicle size, for example, the 2D width of a vehicle appearance in its rear view. For each frame, detection is performed in one scale, and the detection scale may alternate among all available scales. For example, in one exemplary embodiment of the present invention, the part detectors may be trained at three scales, for example: 32-pixel, 40-pixel, 50-pixel, and the detection may be carried out in the following manner: in frame 1, vehicles of size around 32-pixel are detected; in frame 2, vehicles of size around 40-pixel are detected; in frame 3, vehicles of size around 50-pixel are detection; and so on. However, to better accommodate specific applications, the alternate scanning may be designed to maximally cover the road over a span of several frames. To detect vehicle appearances that are larger than the detector scales, the same detection may be performed in reduced resolution image (for example, as seen below in Table 1).

TABLE 1

| Scale | Target Vehicle Size (corner-to-corner) | Image Resolution to Perform Detection |
| --- | --- | --- |
| 1 | Approximately 32-pixels | Original Resolution |
| 2 | Approximately 40-pixels | Original Resolution |
| 3 | Approximately 50-pixels | Original Resolution |
| 4 | Approximately 64-pixels | Reduced Resolution by 2 |
| 5 | Approximately 80-pixels | Reduced Resolution by 2 |
| 6 | Approximately 100-pixels | Reduced Resolution by 2 |
| 7 | Approximately 128-pixels | Reduced Resolution by 4 |
| 8 | Approximately 160-pixels | Reduced Resolution by 4 |
| 9 | Approximately 200-pixels | Reduced Resolution by 4 |

In the current exemplary embodiment, part detectors with three different scales may be applied to three different resolution scales, leading to effective scale coverage of 32, 40, 50, 64, 80, 100, 128, 160, 200 pixels. FIG. 3 illustrates the detection ROIs corresponding to small to large scales. Here, 9 overlapping ROIs are defined in the system to cover the appearance of vehicles of size above 28 pixels. Even though these scales are discrete by the definition of the part detector, a continuous interval of vehicle sizes may be covered by the part detectors. For example, the part detector of size 32 detects corners of vehicles ranging from 28 to 36-pixel wide, the part detector of size 40 detects corners of vehicles ranging from 35 to 45-pixel wide, and so on. The size of a vehicle detectable by the part detectors does not have to be exactly the same as the scale of the part detectors.

Figure 5:
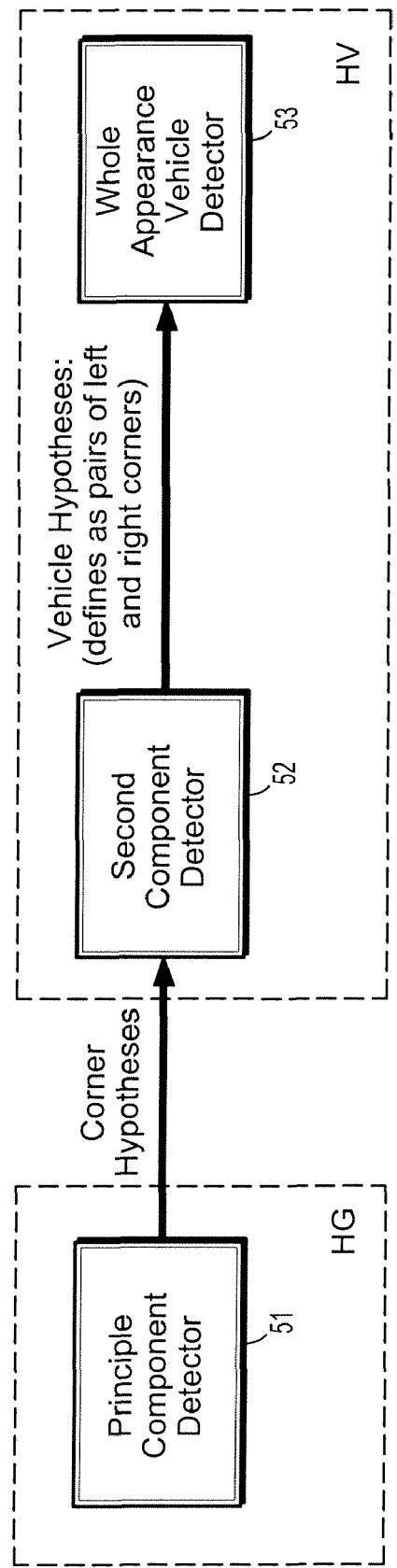
FIG. 5 is a block diagram illustrating an alternative approach to hypothesis handling.

FIG. 4 is a flow chart illustrating hypothesis generation, pruning and validation process in vehicle detection according to an exemplary embodiment of the present invention. FIG. 5 is a block diagram illustrating an alternative approach.

In the approach of FIG. 5, a principal part detector 51 is used to detect a principal vehicle part as part of a hypothesis generation step (HG). As part of a hypothesis verification step (HV), a second part detector may be used. After the second part detector has verified the hypothesis, the hypothesis may be further verified with the use of a whole appearance vehicle detector.

In detecting rear-view vehicles according to an exemplary embodiment of the present invention, first, the detection ROI may be preprocessed for a selected scale (Step S41).

In the preprocessing step (S41) for vehicle detection, the integral image of (log) gradient maps in the selected detection ROI may be calculated for a current image frame. There may be two integral images computed, one for horizontal gradients, and one for vertical gradients. The integral images may be calculated in the original resolution for scales 1 to 3, in reduced resolution (by 2) for scale 4 to 6, and in reduced resolution (by 4) for scale 7 to 9. The integral images may be used to compute the filter response of simple corner detection and the response of part detectors. The whole-appearance vehicle detectors as well as the optional cascaded detectors need not be calculated on the integral images and may instead be calculated in a small fixed-size image patch, as described below.

Figure 6:
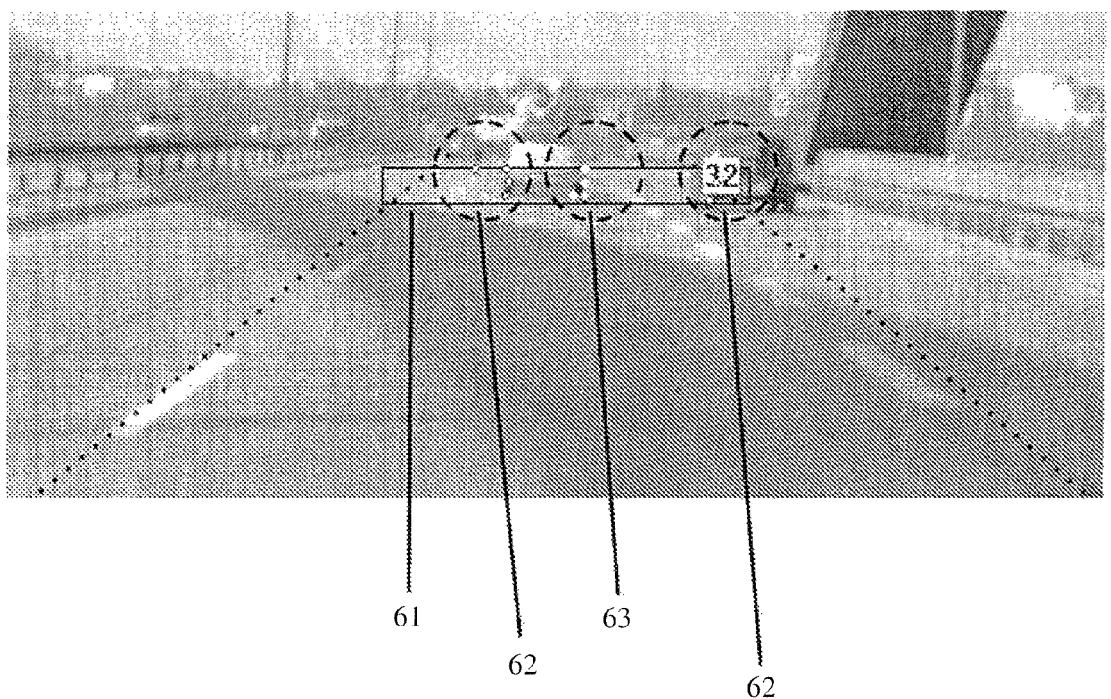
FIG. 6 illustrates hypotheses of preceding vehicle corners generated by corner detection filters according to an exemplary embodiment of the present invention.

A simple corner detection step (S42) may comprise a hypothesis generation (HG) process. In the simple corner detection step (S42), an "L"-shape (and its mirrored shape) filter may be defined to detect "L"-shape corners. The "L"-shape and mirrored "L"-shape filters may be vertically symmetric. The filters are defined on image gradients and may be implemented efficiently through the use of integral images. The filter masks are shown in FIG. 6. For left corner detection, the filter response at location (x,y) may be defined as:

$$r(x, y) = \sum_{m=-M1}^{M1} \sum_{n=-N1}^{0} w_H(m, n) \cdot |G_H(x+m, y-n)| + \sum_{m=0}^{M2} \sum_{n=-N2}^{N2} w_v(m, n) \cdot |G_V(x+m, y-n)| \quad (1)$$

For a right corner detection, the filter response at location (x,y) may be defined as:

$$r(x, y) = \sum_{m=-M1}^{M1} \sum_{n=-N1}^{0} w_H(m, n) \cdot |G_H(x+m, y-n)| + \sum_{m=-M2}^{0} \sum_{n=-N2}^{N2} w_v(m, n) \cdot |G_V(x+m, y-n)| \quad (2)$$

where $G_H(x,y)$, $G_V(x,y)$ denote horizontal and vertical image (logarithm) gradients at location (x,y) in the image coordinate respectively:

$$G_H(x,y)=I(x+1,y)-I(x-1,y) \quad (3)$$

$$G_V(x,y)=I(x,y+1)-I(x,y-1) \quad (4)$$

and I(x,y) denotes pixel value at location (x,y) in the image coordinate, and the weights $w_H(m,n)$, $w_V(m,n)$ are defined as follows:

| Scale (targeted vehicle size) | M1 | N1 (size * ¾) | M2 | N2 | $w_H(m, n)$ | $w_V(m, n)$ |
|---|---|---|---|---|---|---|
| 1 (approx. 32 pixels) | 2 | 24 | 32 | 2 | $w_H(\pm 2, n) = 1$<br>$w_H(\pm 1, n) = 2$<br>$w_H(0, n) = 4$ | $w_V(m, \pm 2) = 1$<br>$w_V(m, \pm 1) = 2$<br>$w_V(m, 0) = 4$ |
| 2 (approx. 40 pixels) | 3 | 30 | 40 | 3 | $w_H(\pm 3, n) = 1$<br>$w_H(\pm 2, n) = 1$<br>$w_H(\pm 1, n) = 2$<br>$w_H(0, n) = 4$ | $w_V(m, \pm 3) = 1$<br>$w_V(m, \pm 2) = 1$<br>$w_V(m, \pm 1) = 2$<br>$w_V(m, 0) = 4$ |
| 3 (approx. 50 pixels) | 4 | 37 | 50 | 4 | $w_H(\pm 4, n) = 1$<br>$w_H(\pm 3, n) = 1$<br>$w_H(\pm 2, n) = 2$<br>$w_H(\pm 1, n) = 2$<br>$w_H(0, n) = 4$ | $w_V(m, \pm 4) = 1$<br>$w_V(m, \pm 3) = 1$<br>$w_V(m, \pm 2) = 2$<br>$w_V(m, \pm 1) = 2$<br>$w_V(m, 0) = 4$ |

Applying the "L"-shape filters may provide two response maps r(x,y), one for left corner and on for right corner detection. Non-maxima suppression may then be performed over the response maps. Non-maximum points may be discarded, and local maxima whose response values are above pre-selected thresholds may be chosen as the hypotheses of vehicle corners. The pre-selected thresholds are obtained by evaluating the filter responses over a large number of vehicle examples and choosing a lower bound.

Example results of corner detection is shown in FIG. 6, where the box 61 highlights the detection ROI for vehicles around 32 pixels, the points 62 show the results of left corner detection and points 63 show the results of right corner detection.

Steps S43 through S48 may comprise a hypothesis verification process. In the next step, the initial corner hypotheses are pruned by the use of vehicle size constraint (Step S43). For each image row (coordinate y) below the horizon, a range of possible 2D vehicle size (for example, width) is pre-calculated based on the lateral measurements of various vehicle models and camera angles with respect to the road plane. The range of possible 2D vehicle sizes may be represented as an interval, for example:

$$\text{Width\_2D}(y) \in [W_{min}(y), W_{max}(y)] \quad (5)$$

For each hypothesis of a left corner, if there exists a right corner hypothesis such that their distance satisfies the size constraint, the hypothesis may be kept; otherwise, the hypothesis may be eliminated. The pruning process may apply to hypotheses of right corners.

Figure 7:
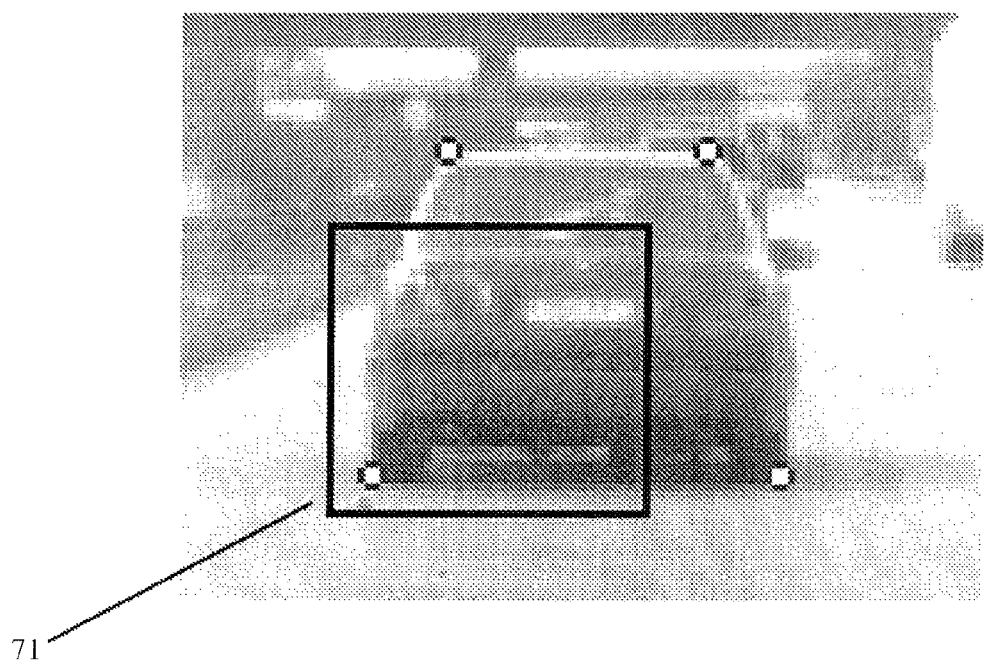
FIG. 7 illustrates an image region used by part detectors according to an exemplary embodiment of the present invention.
Figure 7:
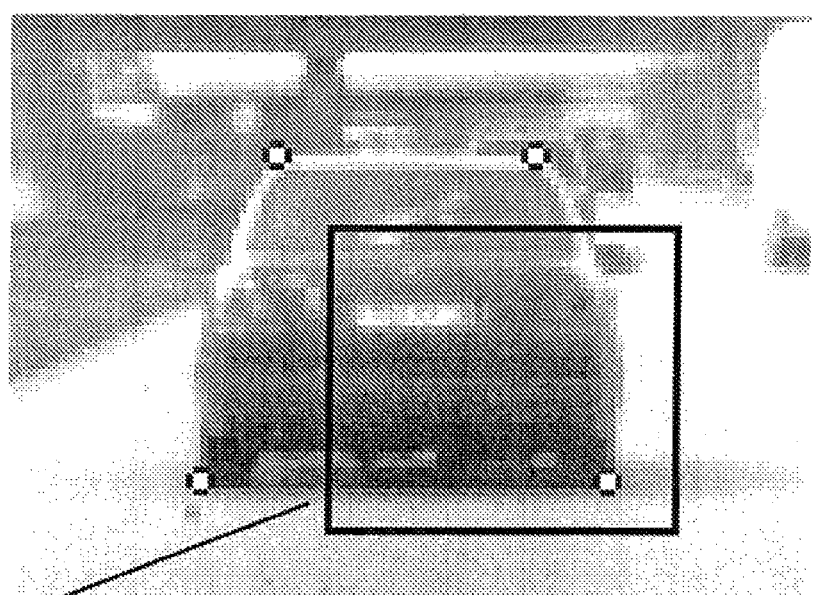

In the next step, the corner hypotheses are further pruned by part detectors (Step S44). The part detectors may be trained classifiers that identify if an image region around a corner point belongs to a vehicle. FIG. 7 shows the image patch around each corner that is used by the part detectors according to an exemplary embodiment of the present invention. The box 71 shows the image patch around the left corner and the box 72 shows the image patch around the right corner.

Compared to the simple corner detection shown in FIG. 5, the part detectors are trained over vehicle examples and are more relevant to vehicle corners. The training algorithms as well as feature design are known in the art.

In the next step, pairs of left and right corner hypotheses which satisfy the vehicle size constraint defined in Step S43 are kept as a group of the vehicle hypotheses (step S45).

Figure 8:
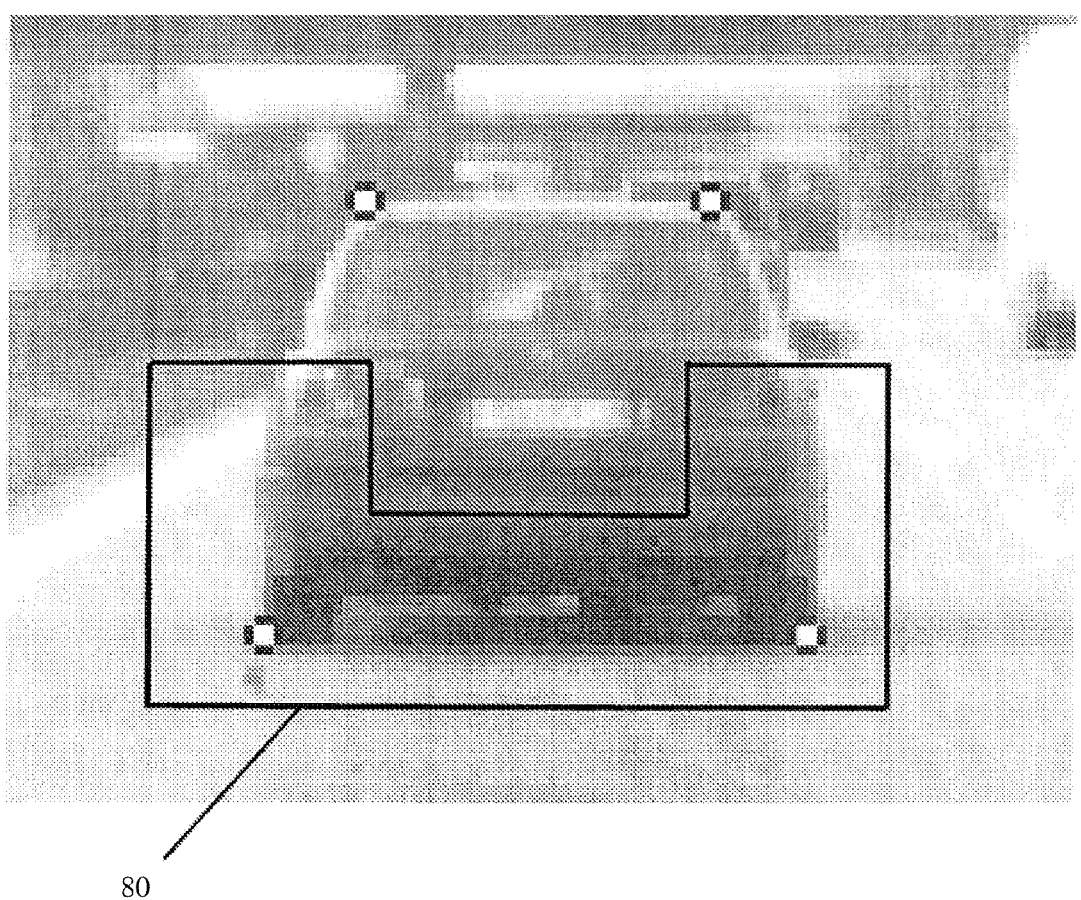
FIG. 8 illustrates a u-shaped image region used to compute a histogram of the orientations of image gradients according to an exemplary embodiment of the present invention.

Then, the orientation histogram may optionally impose a useful constraint on the vehicle class (Step S46). The image patch of a vehicle hypothesis may first be resized into fixed vehicle size. Then the histogram of the gradient orientations in a "U"-shape region is calculated and treated as a dim-d feature vector H. The U-shaped region 80 may be seen in FIG. 8. Principal component analysis may then be performed on the orientation histograms of vehicle examples to obtain their mean $\overline{H}$ and eigenvectors $\{V_i\}$. The constraint may be imposed by bounding the projection on the principal components:

$$T_L < (H-\overline{H})^T \cdot V_i < T_H \tag{6}$$

The upper and lower bounds of the projection coefficients may be learned from vehicle examples.

By using a cascade of classifiers $\{C1, C2, \ldots Cn\}$, including an increasing number of weak classifiers, a large number non-object candidates may be effectively eliminated in early stages with fewer weak classifiers (Step S47). According to an example of this procedure, each individual classifier C1 through Cn may be either passed or rejected. A rejection of any one classifier mat result in the rejection, without testing, of all subsequent classifiers.

In the next step, whole-appearance classifier (for example, one for cars and one for trucks) are applied to determine a final detection scores on all vehicle hypotheses that pass the previous tests (Step S48). A hypothesis may be rejected if its detection score is below a pre-defined threshold, otherwise, it may be kept as a potential vehicle candidate and passed to the tracking and temporal fusion module.

For applications where only a single target needs to be detected and tracked, a post-processing step of merging the detection and finding the best single hypothesis may be used.

A Bayesian filtering framework may offer visual tracking in Bayesian sense. It may be implemented by an iterative procedure to propagate the posterior probability over time. For example, Bayesian filtering may be performed in accordance with the following equations:

$$\text{Prediction: } p(x_t|I_{1:t-1}) = \int p(x_t|x_{t-1}) p(x_{t-1}|I_{t-1}) dx_{t-1} \tag{7}$$

$$\text{Update: } p(x_t|I_{1:t}) = \kappa \cdot p(x_t|I_{1:t-1}) p(I_t|x_t) \tag{8}$$

In the case of Gaussian models and linear dynamics, the Bayesian filter reduces to the well known Kalman filter. The prediction stage predicts the target state (e.g. location) $x_t$ in the new frame $I_t$ from its location $x_{t-1}$ in the previous frame $I_{t-1}$. Very often, the predicted target location $x_t$ may be described by a trust region around $x_{t-1}$ given that the target assumes a random walk. In the case of video vehicle tracking, the dim-3 state variable $x_t$ encodes vehicle location and vehicle size, and the predicted vehicle location and size can be solved through a more detailed dynamic model involving the estimated vehicle heading direction and velocity. In the update step, various measurements from a current frame may be taken into account to update the posterior probability density function.

In implementing Bayesian filtering, the exact likelihood function $p(I_t|x_t)$ may not be available for certain image cues. For example, the response $r_t$ from a vehicle classifier trained to maximize discrimination between vehicles and non-vehicles may not have a straightforward correspondence to an analytic likelihood term $p(r_t|x_t)$, yet the cue may still be important to vehicle tracking. Moreover, the posterior density function $p(x_t|I_{1:t})$ often presents a multi-modal nature and it may be too time consuming to maintain the posterior in its exact form or even to maintain multiple hypotheses in tracking. To address these issues, tradeoffs and approximations may be made in fusing useful cues. Rather than maintaining the exact posterior, a single most likely hypothesis or multiple hypotheses with highest posteriors may be maintained to approximate the posterior using the most important mode.

Two types of measurements may be used in video vehicle tracking: the response of vehicle classifiers and the matching against vehicle templates. Vehicle classifiers may impose an appearance-based constraint on the whole vehicle class, which might not distinguish between different vehicle instances. Template-based matching may provide a second measurement for vehicle tracking. In addition, shape templates may be used as a specialized model for a specific vehicle instance, to exploit the temporal association inherent in visual tracking. To meet stringent runtime requirement of this system, the single best hypothesis may be tracked. Classifier response and matching results may be fused to determine the target location. Because template matching produces state estimation with better localization accuracy and classifier response gives better discrimination against background, the two types of measurements may be fused in such a way that template matching generates multiple location and size hypotheses, and that classifier response helps to determine the best single hypothesis.

Rather than using vehicle detectors to track targets, a "real-sense" tracking scheme may be introduced in the system. In such a scheme, a template-based tracking algorithm called kernel-based probabilistic shape tracking (KPSTracker) may be introduced to perform temporal matching. Vehicle detectors may then used to verify the tracking result.

Figure 9:
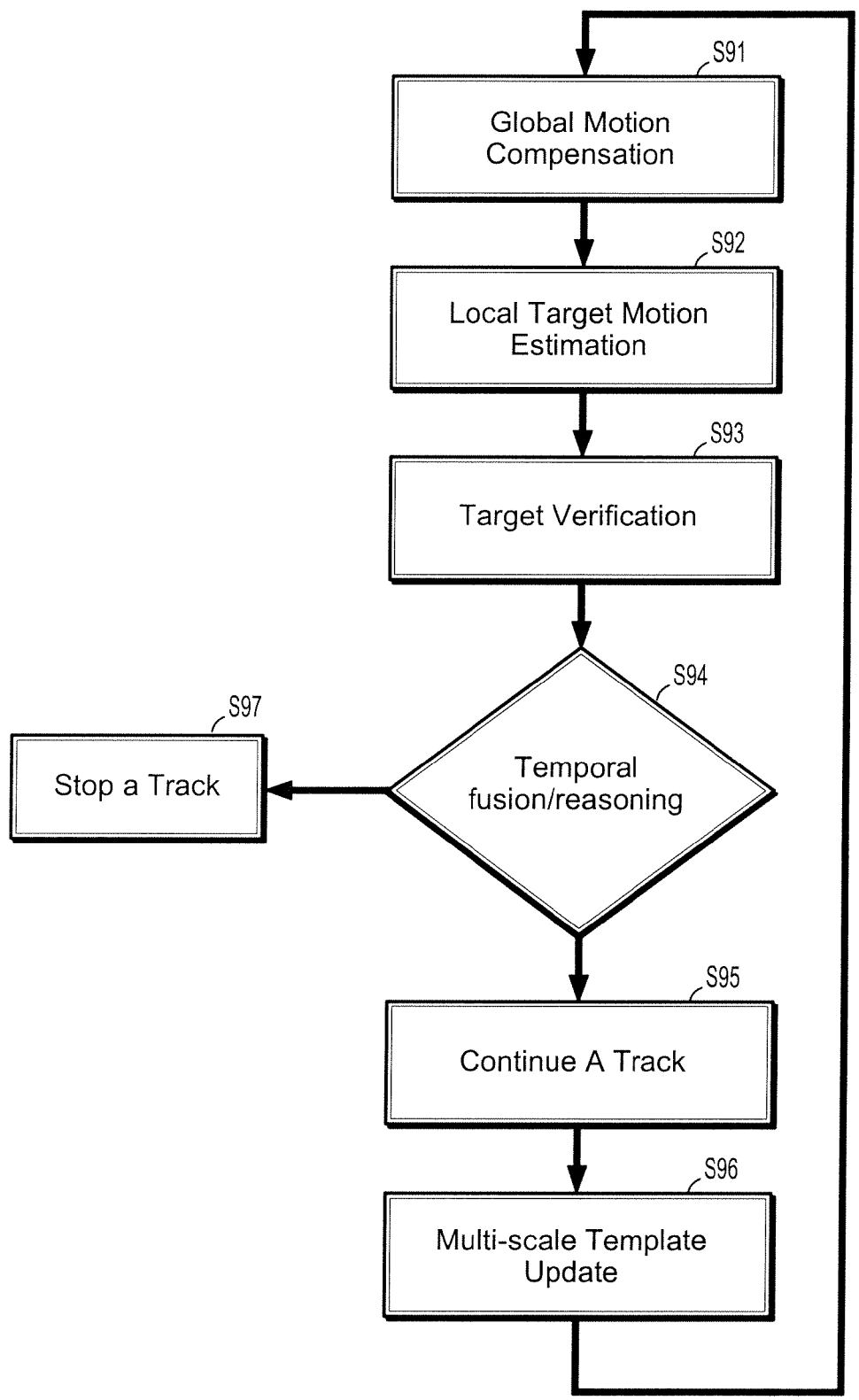
FIG. 9 is a flow chart illustrating a process of tracking a vehicle according to an exemplary embodiment of the present invention.

FIG. 9 is a flow chart illustrating a process of tracking a vehicle according to an exemplary embodiment of the present invention. The first step includes global motion compensation (Step S91). Global motion may be caused by abrupt camera shocks and/or vibrations, which may cause large image motion in the vertical direction. To compensate for such global image motion, optical flow algorithms may be used to estimate a 2D motion vector over a large image patch around the target vehicle. To reduce computational expense, optical flow estimation may be performed in a reduced-resolution image.

After global motion compensation, local target motion estimation may be performed (Step S92). In this step, an object tracker may be applied to locate the target vehicle more precisely in a new frame. Kernel-based probabilistic shape tracking may then be used to track an object by matching feature points. Multiple hypotheses about target location may be generated by the tracking algorithm. Each hypothesis may have a corresponding matching score.

Next, target verification may be performed (Step S93). This step may fuse two measurements: template matching and detector response. The appearance-based vehicle detector may be used as a "gating" function to verify that the tracker indeed locks on a vehicle and does not drift to a background patch. The gating function accepts hypotheses whose response from the appearance-based vehicle detector is above a pre-determined threshold. The single best hypothesis may be determined, for example, as the one that has the best match with the templates among all the hypotheses from the local target motion estimation step (S92) whose response from the vehicle detector is accepted the gating function. Note, the single best hypothesis determined in this way may not be the hypothesis with highest response from the vehicle detector.

Accordingly, in a temporal fusion and reasoning step (Step S94) it is determined whether a particular instance of tracking should be continued or stopped. If it is determined that the tracking is to be stopped, for example, the tracker is determined to not be locked onto a vehicle or a tracked vehicle has drifted to a background patch, then tracking is stopped (Step S97). If it is determined that tracking should continue, then tracking may continue (Step S95).

When a new vehicle appearance is first detected by the vehicle detector, a shape template may be built for this target. As discussed above, the shape template may be multi-scale, including multiple different resolutions. As tracking continues, the multi-scale shape template may be updated in accordance with additional data that is obtained (Step S96). Thereafter, the process may repeat (Step S91) until tracking is eventually stopped (Step S97).

In building the shape template, zero-crossings in the second order derivatives of an image that have strong horizontal or vertical gradients in the image patch containing the target may be extracted. Zero-crossings are local maxima of the first order derivatives (i.e. image gradients). These feature points may be represented by their location in the image coordinate and their gradient vector and they may comprise the shape template. A confidence score associated with the shape template may be produced by applying the vehicle detector on the shape template. This score may indicate the quality of the shape template, in terms of the likelihood of being a vehicle. During tracking, the shape template may be updated once a higher detector score is obtained at certain time instance. To keep a moderate number of feature points in template matching, tracking of large targets may be performed in reduced resolution. Hence, multi-scale shape templates may be built and updated in multiple resolutions. In the current exemplary embodiment, the number of feature points used in the shape template may be about 10%-20% of the image patch around the vehicle appearance.

In kernel-based probabilistic shape tracking (KP-STracker), the feature point in the shape template may be denoted as $\{Y_i = y_i, G_i\}$, where $y_i$ denotes the image coordinate of the feature point and $G_i$ denotes the normalized gradient vector of the feature point. The feature points in an image frame may be denoted as $\{Z_i = z_i, g_i\}$, where $z_i$ and $g_i$ denote the image coordinate and normalized gradient vector of the feature point respectively. A probabilistic model describing the feature point distribution in the image data may be defined by kernel-based representation:

$$p_D(Z|\{Z_j\}) = \sum_j k(Z; Z_j, \Lambda) \quad (9)$$

$$= \sum_j \exp\left(-\frac{1}{2\sigma_z^2}\|z - z_j\|^2\right)\exp\left(-\frac{1}{2\sigma_g^2}\|g - g_j\|^2\right)$$

Where $k(Z;Z_j,\Lambda)$ denotes a Gaussian function with mean $Z_j$ and covariance matrix $$\Lambda = \begin{bmatrix} \sigma_z^2 & 0 \\ 0 & \sigma_g^2 \end{bmatrix},$$

$\sigma_z$ denotes the bandwidth of a Gaussian kernel for the image location of feature points, and $\sigma_g$ denotes the bandwidth of a Gaussian kernel for the gradient vector of feature points. It may be assumed that the rear side of a vehicle is approximately planar, and the vehicle is moving either along the optical axis or laterally, for example, no significant turning is considered. The 2D motion of the vehicle's rear side may be approximately modeled by translation and scaling. To find the best target location and target size, a three dimensional problem may be solved, for example, the optimal translation and scaling parameters may be found. The translation parameter may be denoted as $T=(T_x, T_y)$ and scaling parameter s. Matching a set of feature points in an image frame to a set of feature points in a shape template may be formulated as the following optimization problem:

$$(T, s)_{opt} = \mathrm{argmax} \prod_i P_D([y_i, G_i]^T | \{s \cdot z_j + T\}, g_j\}) \quad (10)$$

$$= \mathrm{argmax} \sum_i \log\left[\sum_j k(y_i; s \cdot z_j + T, \sigma_z^2) \cdot k_{i,j}\right]$$

$$k_{i,j} = k(G_i, g_j)$$

Here, $s \cdot z_j + T$ defines an inverse transformation that maps feature points in an image frame into template coordinates. Under the transformation (T,s), each of the feature points in an image frame $z_j$ may generate a local distance metric $$k(Z; Z_j, \Lambda) = \exp\left(-\frac{1}{2\sigma_Z^2}\|z - (s \cdot z_j + T)\|^2\right)\exp\left(-\frac{1}{2\sigma_g^2}\|g - g_j\|^2\right)$$

through Gaussian kernels, where the transformed feature point $s \cdot z_j + T$ defines the center for a location kernel $$\exp\left(-\frac{1}{2\sigma_Z^2}\|z - (s \cdot z_j + T)\|^2\right),$$

and its normalized gradient vector $g_j$ defines the center for a normalized gradient kernel $$\exp\left(-\frac{1}{2\sigma_g^2}\|g - g_j\|^2\right).$$

This local distance metric may measure how close an arbitrary feature point Z is to the transformed feature point (in the shape template) in terms of its location and the similarity of the image gradients under a specific transformation (T,s). Accordingly, the summation $$\sum_j k(y_i; s \cdot z_j + T, \sigma_z^2) \cdot k_{i,j}$$

of the local distance metrics over a group of distributed feature points $\{Z_j: j=1, 2, \ldots\}$ may measure how close an arbitrary group of feature points $\{Y_i: i=1, 2, \ldots\}$ is to the group of feature points $\{Z_j: j=1, 2, \ldots\}$ under a specific transformation (T, s). The formula (10) may thus be used to find the optimal transformation objective function $(T,s)_{opt}$ such that under such a transformation, the set of feature points $\{Y_i: i=1, 2, \ldots\}$ in the shape template is the most similar transformation to the set of feature point extracted from an image frame (up to translation T and scaling s) in terms of their locations and normalized gradients.

From statistical point of view, the objective function (10) may be interpreted as the likelihood that template feature points are generated by the same distribution of the feature points from the image feature points. Gaussian kernels may be used in defining the cost function. Compared to other distance metrics such as the Euclidean distance, this approach may have greater tolerance for outliers because the influence of outliers (such as feature points caused by shadows etc.) is bounded.

Gradient ascent method may be used to iteratively optimize the transformation parameters. Starting from an initialization point, the method may iteratively improve the transformation parameters in the gradient ascent direction of the objective function. The mathematical formulation for the KPSTracker is described in detail below. In general, the surface of the matching function at various translations and scale values may have multiple local maxima. The global maximum may be located. To minimize the opportunity for the gradient ascent method resulting in a local maxima, there may be multiple initializations in the parameter space and the gradient ascent algorithm may be run multiple times.

The iterative procedure for optimizing the objective function may achieve sub-pixel accuracy. However it may be computationally expensive and slow. To speed up the matching process, a coarse-to-fine approach may be adopted where two levels of matching are performed.

In the first level (course matching), the objective function may be replaced by a course approximation. Instead of using the Gaussian function to define the penalty term on the normalized gradient vector, the gradient penalty term may be made discrete. Here, each image pixel may be assigned a label $\{l_H, l_V, l_{HV}, l_N\}$ representing the pixel being a zero-crossing point in the horizontal direction, a zero-crossing in the vertical direction, a zero-crossing point in both directions, and a non-zero-crossing point. If the label of the i-th feature point in the shape template matches the label of the j-th feature point in the current frame, it may be defined that $k_{i,j}=1$. This coarse matching may be computationally less expensive than the Gaussian approach and fairly efficient implementation may be feasible through pre-calculation of distance maps from feature locations.

To track a target vehicle in the current frame the three dimensional parameter space (s, tx, ty) may be sampled uniformly around the target location in the previous frame, and the matching function on the discrete sampling grid $\{(s_i, tx_i, ty_j)\}$ may be computed. For each sample point $(s_i, tx_i, ty_j)$, the value of matching score may be compared with the matching scores over its neighboring samples to find local maxima. A local maximum is a mode point of the objective function (equation 10). Multiple modes may be identified in coarse matching and may serve as the initialization for fine matching.

In the second level (fine matching), the mode locations obtained in the first level coarse matching may be refined by optimizing the objective function defined in equation (10). Starting from the discrete sample points identified as modes in the first level matching, the gradient ascent procedure described in detail below with reference to KPSTracking may be performed to converge to the local maxima of the objective function (10).

To calculate the objective function from the kernel functions, a number of exponential functions may be calculated. However, three approaches for simplifying the calculation are presented herein:

In the first approach, each kernel (for example, centered at $Z_j=[z_j, g_j]$) may have a limited support, thus feature points (x) far away from $z_j$ may be ignored and their function values need not be calculated.

In the second approach, the exponential function may be pre-calculated and stored in a look-up table to reduce online computation.

In the third approach, when a shape template is matched against multiple image regions, some computation in the kernel density functions may be shared among different matches. If the search region, for example, the points on the image grid $\{x\}$ are known, then the function value $p_D(X|\{Z_j\})$ may be calculated once. The mask need only be around to sum up the matching values.

The computation of shape template matching may include two parts. In the first part, pre-calculation of quantities form feature points in the image data that may be reused in optimization. The computational complexity of pre-calculation is linear to the feature points in the search region.

The second part (matching) may include iterative optimization from multiple initialization points. The objective function may first be computed on a coarse grid in 3D parameter space (T,s). Some of the parameter configurations may be eliminated by geometry constraints. After the initial calculation, a few top matches (for example, local maxima) may be maintained as the initial locations to perform gradient-based iterative optimization for more precise (for example, sub-pixel) matching. The local maximum, for example, the modes in the objective function, obtained by the shape template matching may be candidate locations of the target vehicle in the current image frame.

Figure 10:
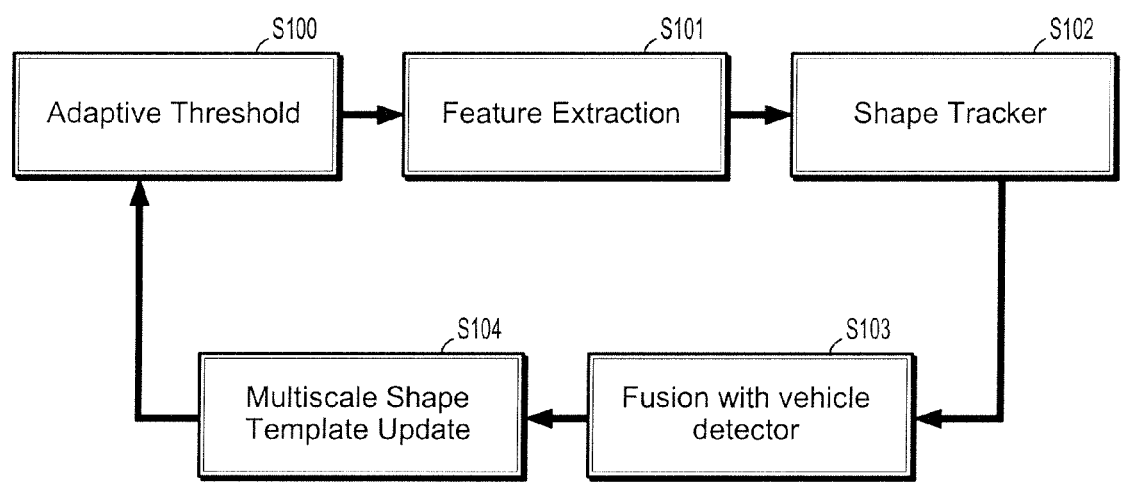
FIG. 10 is a flow chart illustrating a process for local target motion estimation according to an exemplary embodiment of the present invention.

A process for the KPSTracker according to an exemplary embodiment of the present invention is illustrated in the flow chart of FIG. 10. First, an adaptive threshold may be chosen such that the number of zero-crossing points whose gradient magnitude is above the threshold is proportional to the size of a local image patch around the vehicle location from the previous frame (Step S100). Then, zero-crossings with gradient magnitude above the adaptive threshold are extracted from the local image patch and define features points (Step S101). Then the kernel-based probabilistic shape tracker may be performed to find local maxima, i.e. candidate vehicle locations (Step S102). Vehicle detector may be applied to determine the most probable vehicle location (Step 103). The multiscale shape templates may then be updated by extracting feature points in a local image patch at the most probable vehicle location (Step S104) and then the process may repeat.

Because template-based matching is designed for target localization, for example, precise target location and size estimation, and the vehicle detector is designed for object discrimination, the two measurements may be fused in the following way. The response of a vehicle detector may serve as a "gating" function to eliminate modes of the matching function where the detector response is low suggesting that it is likely drifting away from a vehicle. From the modes where detection response is high enough suggesting the matching window is right on a vehicle instance, the best mode may be picked with the highest value of the matching function indicating the best alignment with the template. With this fusion strategy, drifting may be detected through the use of vehicle detector response.

Accuracy of the shape tracker may be increased by the use of "multiple templates" to describe vehicle instances over a prolonged time period. This approach may improve the KPST's capacity for handling large variance in vehicle appearance due to significant lighting change. According to this approach, a target vehicle may be associated with multiple shape templates, each across multiple scales. Moreover, selection of optimum template scale may utilize a determination of the actual vehicle size. Large vehicles may be tracked in a reduced resolution scale such that the number of template feature points for the reduced resolution scale is computationally affordable. Since a single shape template in any scale may be limited to one time instance of the tracked target, the template may be extended to incorporate more variety information. Examples of multiple template approaches may be found in Simon Baker, "The Template Update Problem" IEEE PAMI 2004, which is herein incorporated by reference. Alternatively, the statistical representation of the template (for example, in the form of weighted feature points) may be amended to reflect variance in multiple instances. Also, by exploring correspondence across multiple instances, segmentation around vehicle borders may be made more accurate. In tracking vehicles making sharp turns, the three parameter model may be extended to an affine motion model.

In fusing video vehicle detection and tracking module with other sensor modalities, the multi-modal nature of video measurement may be taken into consideration. Multi-hypothesis analysis may be used even where only a single hypothesis is being tracked, due to the fact that outliers and background are co-observed by the camera sensor.

After detection and tracking functions are performed, the results may be assembled and used in initiating, maintaining, updating and terminating a track over time. Temporal fusion and reasoning may be performed in the function of "Assembling Results."

When applied to adaptive cruise control (ACC) or traffic jam assist, a single preceding vehicle may be followed over time. According to an exemplary embodiment of the present invention, the following steps may be performed by the function of "Assemble Results":

1. Establish a track when a vehicle is detected for the first time.
2. For an existing target, track the target, accumulate the confidence score (for example, the response from vehicle detector) and maintain target history over time.
3. Confirm a vehicle target when the target has been tracked for over a predetermined time span and/or it has achieved a confidence score that is over a predetermined level.
4. Determine whether the existing target is moving inside the same lane as the host vehicle.
5. Determine to discontinue a track if the target is moving out of the lane or the accumulated confidence is below a predetermined level.
6. Output a confirmed vehicle target.

Exemplary embodiments of the present invention may detect and track multiple targets. In such embodiments, the following steps may be performed in an "Assemble Results" function:

1. Establish a track for each vehicle that has been newly detected.
2. For existing targets, track the targets, accumulate confidence scores (for example, the response from vehicle detector) for the targets and maintain target histories over time.
3. Confirm a vehicle target when the target has been tracked for a predetermined time span and/or it has achieved a confidence score that is over a predetermined level.
4. Determine to discontinue a track if the accumulated confidence is too low.
5. Output confirmed vehicle targets.

As described above, kernel-based probabilistic shape tracking (KPSTracker) may be used to perform temporal matching. In performing KPSTracking, the following optimization problem may be solved:

$$(T, s)_{opt} = \operatorname{argmax} \prod_i P_D([y_i, G_i]^T | \{s \cdot z_j + T\}, g_j)) \quad (11)$$

$$= \operatorname{argmax} \sum_i \log \left[ \sum_j k(y_i; s \cdot z_j + T, \sigma_z^2) \cdot k_{i,j} \right]$$

$$k_{i,j} = k(G_i, g_j)$$

Here, (T, s) denotes the translation and scaling parameters, $(z_j, g_i)$ denotes the location and gradient of the j-th feature point in the testing frame, and $(y_i, G_i)$ denotes the location and gradient of the i-th feature point in the template. The transformation parameter (T, s) may be iteratively adjusted by a small amount in each iteration to increase the likelihood term (11).

To describe the solution in a vector form, a different notation may be used for the transformation parameters:

$$T = \begin{bmatrix} s \\ tx \\ ty \end{bmatrix},$$

$$\bar{z}_j = \begin{bmatrix} x_j & 1 & 0 \\ y_j & 0 & 1 \end{bmatrix}$$

Here, (s, tx, ty) denotes one scaling parameter and two translational parameters, and $(x_j, y_j)$ denotes the location of the j-th feature point in the testing frame. Accordingly, problem (11) may be written as:

$$T_{opt} = \operatorname{argmax} \sum_i \log \left[ \sum_j k(y_i; \bar{z}_j T, \sigma_z^2) \cdot k_{i,j} \right] \quad (12)$$

$$k_{i,j} = k(G_i, g_j) = \frac{1}{2\pi\sigma_g^2} \exp\left(-\frac{1}{2\sigma_g^2} \|G_i - g_j\|^2\right)$$

$$k(y_i; \bar{z}_j T, \sigma_z^2) = \frac{1}{2\pi\sigma_z^2} \exp\left(-\frac{1}{2\sigma_g^2} \|y_i - \bar{z}_j T\|^2\right)$$

At each iteration step, A Taylor expansion may be applied. It may be assumed that the transformation parameter vector at this step is given by T:

$$\|y_i - \bar{z}_j(T + \delta T)\|^2 = \|y_i - \bar{z}_j T\|^2 + \Delta d \quad (13)$$
$$\Delta d = (\delta T)^T (\bar{z}_j^T \bar{z}_j) \delta T - 2(y_i - \bar{z}_j T)^T \delta T$$

$$k(y_i; \bar{z}_j(T + \delta T), \sigma_z^2) \approx k(y_i; \bar{z}_j T, \sigma_z^2) + k(y_i; \bar{z}_j T, \sigma_z^2)\left(-\frac{1}{2\sigma_z^2}\right)\Delta d \quad (14)$$

$$\log\left[\sum_j k(y_i; \bar{z}_j(T + \delta T), \sigma_z^2) \cdot k_{i,j}\right] \approx \quad (15)$$

$$\log\left[\sum_j k(y_i; \bar{z}_j T, \sigma_z^2) \cdot k_{i,j} + \sum_j k(y_i; \bar{z}_j T, \sigma_z^2)\left(-\frac{1}{2\sigma_z^2}\right)\Delta d\right] \approx$$

$$\log\left[\sum_j k(y_i; \bar{z}_j T, \sigma_z^2) \cdot k_{i,j}\right] +$$

$$\frac{1}{\sum_j k(y_i; \bar{z}_j T, \sigma_z^2) \cdot k_{i,j}} \sum_j k(y_i; \bar{z}_j T, \sigma_z^2)\left(-\frac{1}{2\sigma_z^2}\right)\Delta d$$

As denoted herein:

$$A_j = (\bar{z}_j)^T \bar{z}_j, \ w_{i,j} = k(y_i; \bar{z}_j T, \sigma_z^2), \ a_i = \frac{1}{\sum_j w_{i,j} k_{i,j}},$$

$$b_{i,j} = (y_i - \bar{z}_j T)^T \bar{z}_j$$

The objective function may be expressed as:

$$\sum_i \log\left[\sum_j k(y_i; \bar{z}_j T, \sigma_z^2) \cdot k_{i,j}\right] \approx \qquad (16)$$

$$\sum_{i,j} a_i w_{i,j} k_{i,j} [(\delta T)^T A_j (\delta T) - 2b_{i,j}(\delta T)]$$

Accordingly, a small increment $\delta T$ may be found such that:

$$\delta T = \operatorname{argmin} \sum_{i,j} a_i w_{i,j} k_{i,j} [(\delta T)^T A_j (\delta T) - 2b_{i,j}(\delta T)] \qquad (17)$$

$$= \left[\sum_{i,j} a_i w_{i,j} k_{i,j} A_j\right]^{-1} \left[\sum_{i,j} a_i w_{i,j} k_{i,j} b_{i,j}\right]$$

Figure 11:
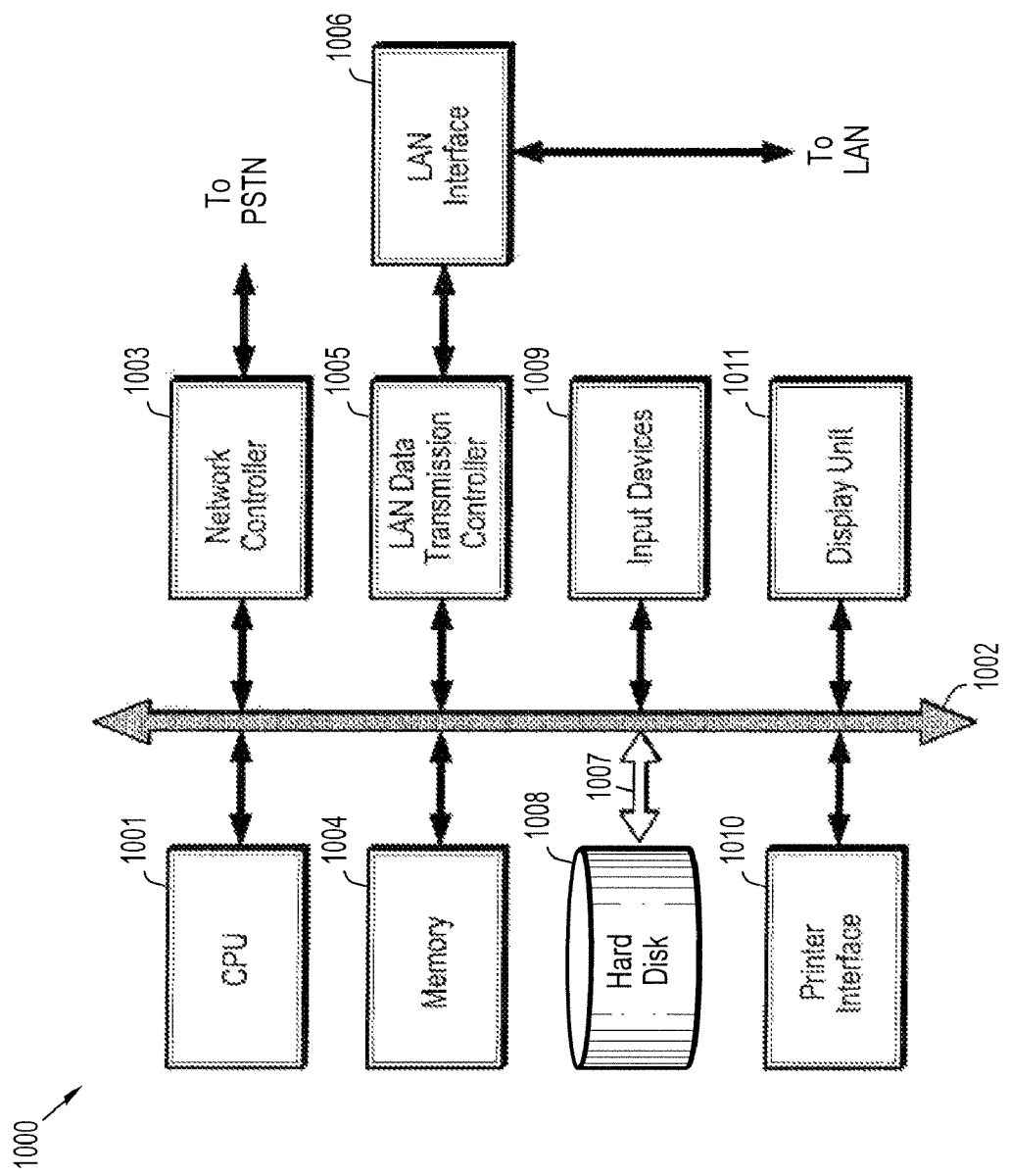
FIG. 11 shows an example of a computer system capable of implementing the method and apparatus according to embodiments of the present disclosure.

FIG. 11 shows an example of a computer system which may implement a method and system of the present disclosure. The system and method of the present disclosure may be implemented in the form of a software application running on a computer system, for example, a mainframe, personal computer (PC), handheld computer; server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Figure 12:
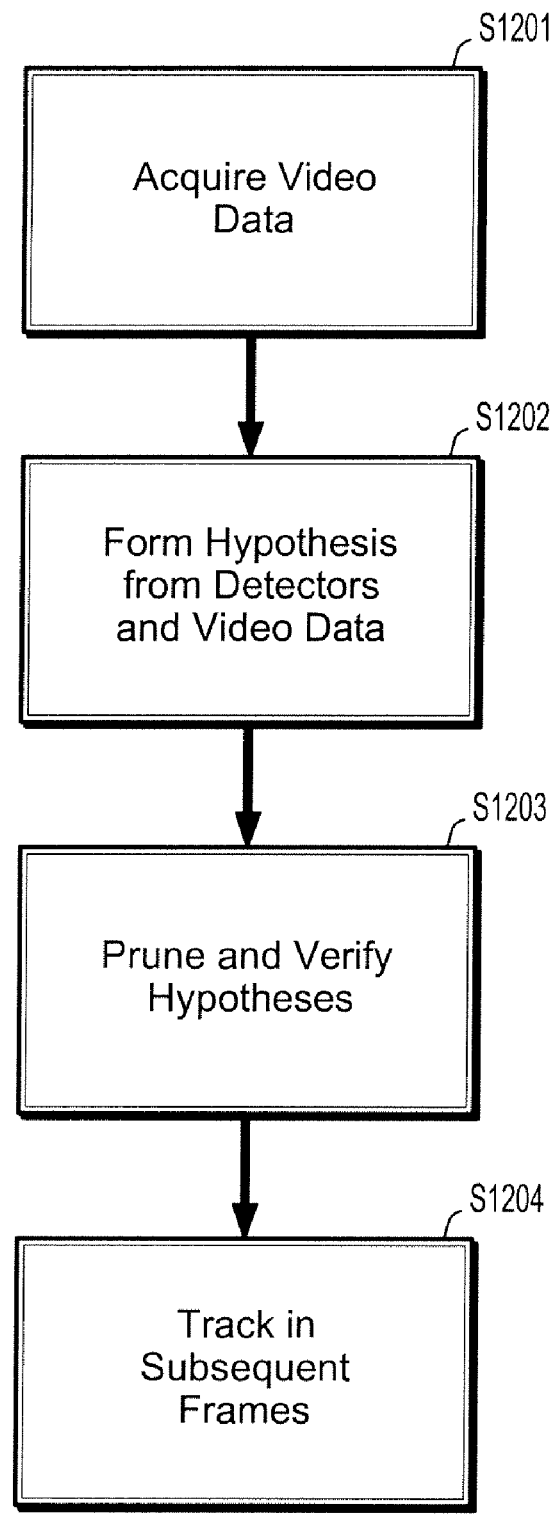
FIG. 12 is a flow chart illustrating a detection and tracking framework according to an exemplary embodiment of the present invention.

FIG. 12 is a flow chart illustrating a detection and tracking framework according to an exemplary embodiment of the present invention. Details of this exemplary embodiment may be described in detail above. First, video data including a plurality of frames may be acquired (Step S1201). A first frame of the acquired video data may then be compared against a set of one or more vehicle detectors to form vehicle hypotheses (Step S1202). The vehicle hypotheses may then be pruned and verified using a set of course-to-fine constraints to detect a vehicle (Step S1203). Finally, the detected vehicle may be tracked within one or more subsequent frames of the acquired video data by fusing shape template matching with one or more vehicle detectors (Step S1204).

The above specific exemplary embodiments are illustrative, and many variations can be introduced on these embodiments without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for vehicle detection and tracking, comprising:
   acquiring video data including a plurality of frames;
   comparing a first frame of the acquired video data against a set of one or more vehicle detectors to form vehicle hypotheses;
   pruning and verifying the vehicle hypotheses using a set of coarse-to-fine constraints to detect a vehicle; and
   tracking the detected vehicle within one or more subsequent frames of the acquired video data by fusing shape template matching with one or more vehicle detectors,
   wherein the set of coarse-to-fine constraints includes a first level in which an objective function is replaced by a course approximation and a second level in which mode locations obtained in the first level are refined by optimizing the objective function.

2. A method for vehicle detection and tracking, comprising:
   acquiring video data including a plurality of frames;
   comparing a first frame of the acquired video data against a set of one or more vehicle detectors to form vehicle hypotheses;
   pruning and verifying the vehicle hypotheses using a set of coarse-to-fine constraints to detect a vehicle; and
   tracking the detected vehicle within one or more subsequent frames of the acquired video data by fusing shape template matching with one or more vehicle detectors,
   wherein the detected vehicle is tracked within subsequent frames by kernel-based probabilistic shape tracker, and
   wherein the kernel-based probabilistic shape tracker estimates vehicle motion by matching feature points in an image region with one or more shape templates that have been extracted from a corresponding target of a previous frame.

3. The method of claim 2, wherein the video data is acquired using a camera mounted on a moving host vehicle.

4. The method of claim 2, wherein the set of vehicle detectors includes at least one class-specific detector.

5. The method of claim 4, wherein the set of vehicle detectors includes at least one car specific detector.

6. The method of claim 4, wherein the set of vehicle detectors includes at least one truck specific detector.

7. The method of claim 2, wherein the set of vehicle detectors includes an "L" shape corner detector and its mirrored shape corner detector.

8. The method of claim 2, wherein the set of coarse-to-fine constraints includes vehicle part detectors learned from examples of vehicle lower left part and vehicle lower right part.

9. A method for vehicle detection and tracking, comprising:
   acquiring video data including a plurality of frames;
   comparing a first frame of the acquired video data against a set of one or more vehicle detectors to form vehicle hypotheses;
   pruning and verifying the vehicle hypotheses using a set of coarse-to-fine constraints to detect a vehicle; and
   tracking the detected vehicle within one or more subsequent frames of the acquired video data by fusing shape template matching with one or more vehicle detectors,
   wherein the set of coarse-to-fine constraints includes vehicle part detectors learned from examples of vehicle lower left part and vehicle lower right part, and
   wherein the vehicle part detectors are followed by an orientation histogram constraint.

10. The method of claim 9, wherein the orientation histogram constraint is followed by a cascade car/truck detector.

11. The method of claim 2, wherein the vehicle hypotheses are pruned and verified with a second set of one or more vehicle detectors, different from the set of one or more vehicle detectors used to form the vehicle hypotheses.

12. The method of claim 2, wherein the responses of vehicle detectors are accumulated over time.

13. The method of claim 2, wherein the shape templates are composed of a set of zero-crossing points.

14. The method of claim 13, wherein the zero-crossing points are described by their locations and gradient vectors.

15. The method of claim 2, wherein matching feature points in an image region with a shape template is performed by optimizing a kernel-based nonparametric density estimation on zero-crossing points.

16. The method of claim 15, wherein optimizing a kernel-based nonparametric density estimate on zero-crossing points generates multiple modes of vehicle motion parameters.

17. The method of claim 16, wherein a single best mode of vehicle motion parameters is determined as the mode that has the highest function value of the kernel-based nonparametric density estimate and whose response from the vehicle detectors is above a pre-selected value.

18. The method of claim 2, wherein the shape templates are updated to reflect frame-to-frame variance in target appearance.

19. The method of claim 2, further including assembling results of the verifying step and the tracking step to determine whether tracking is maintained or terminated.

20. The method of claim 2, wherein multiple vehicles are tracked simultaneously.

21. The method of claim 2, wherein the first video frame is represented as an image pyramid of multiple resolutions.

22. The method of claim 21, wherein in the forming of the vehicle detection hypotheses, detection of a vehicle appearing to be relatively small is performed in a relatively high resolution and detection of a vehicle appearing to be relatively large is performed in a relatively low resolution.

23. The method of claim 21, wherein tracking is performed at multiple resolutions.

24. The method of claim 2, wherein in verifying the vehicle detection hypotheses using a set of coarse-to-fine constraints, one or more component detectors are used.

25. The method of claim 2, wherein verified vehicle hypotheses is additionally verified using a whole-appearance vehicle detector.

26. The method of claim 2, wherein template-based tracking is used to track the detected vehicle within the one or more frames.

27. The method of claim 26, wherein template-based tracking uses kernel-based probabilistic shape tracking.

28. A system for vehicle detection and tracking, comprising:
   a camera mounted on a moving host vehicle for acquiring video data including a plurality of frames; and
   a central tracker for comparing a first frame of the acquired video data against a set of one or more vehicle detectors to form a vehicle detection hypotheses, verifying the vehicle detection hypotheses to detect a vehicle, and tracking the detected vehicle within one or more subsequent frames of the acquired video data,
   wherein the detected vehicle is tracked within subsequent frames by kernel-based probabilistic shape tracker, and
   wherein the kernel-based probabilistic shape tracker estimates vehicle motion by matching feature points in an image region with one or more shape templates that have been extracted from a corresponding target of a previous frame.

29. The system of claim 28, wherein the set of vehicle detectors includes at least one car or truck specific detector.

30. The system of claim 28, wherein the first video frame is represented as an image pyramid of multiple resolutions and tracking is performed at multiple resolutions.

31. A computer system comprising:
   a processor; and
   a program storage device readable by the computer system, embodying a program of instructions executable by the processor to perform method steps for vehicle detection and tracking, the method comprising:
   acquiring video data including a plurality of frames;
   comparing a first frame of the acquired video data against a set of one or more vehicle detectors to form a vehicle detection hypotheses; and
   tracking the detected vehicle within one or more subsequent frames of the acquired video data,
   wherein the detected vehicle is tracked within subsequent frames by kernel-based probabilistic shape tracker, and
   wherein the kernel-based probabilistic shape tracker estimates vehicle motion by matching feature points in an image region with one or more shape templates that have been extracted from a corresponding target of a previous frame.

32. The computer system of claim 31, wherein the vehicle detection hypotheses is verified using a set of coarse-to-fine constraints to detect a vehicle.

33. The computer system of claim 31, wherein the set of vehicle detectors includes at least one car or truck specific detector.

34. The computer system of claim 31, wherein the first video frame is represented as an image pyramid of multiple resolutions and tracking is performed at multiple resolutions.

* * * * *